G. WESTINGHOUSE, Jr.
MEANS FOR DETECTING LEAKS IN GAS MAINS.
No. 10,561. Reissued Feb. 17, 1885.
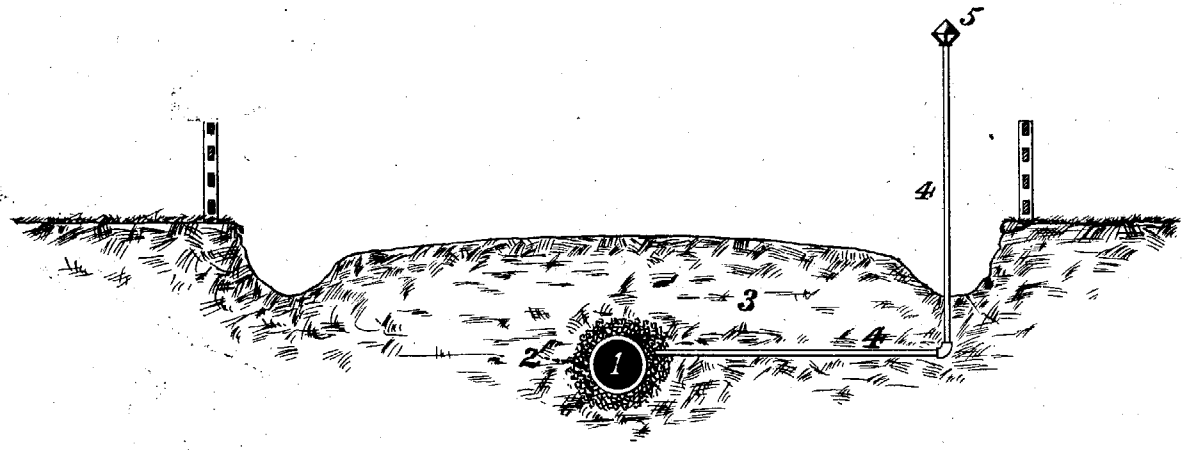
WITNESSES:
J. Snowden Bell
C. M. Clarke
INVENTOR.
George Westinghouse Jr.
BY George H. Christy
ATTORNEY.

UNITED STATES PATENT OFFICE.

GEORGE WESTINGHOUSE, JR., OF PITTSBURG, PENNSYLVANIA.

MEANS FOR DETECTING LEAKS IN GAS-MAINS.

SPECIFICATION forming part of Reissued Letters Patent No. 10,561, dated February 17, 1885.

Original No. 306,566, dated October 14, 1884. Application for reissue filed January 27, 1885.

*To all whom it may concern:*

Be it known that I, GEORGE WESTINGHOUSE, Jr., a citizen of the United States, residing at Pittsburg, in the county of Allegheny and State of Pennsylvania, have invented or discovered a certain new and useful Improvement in Means for Detecting Leaks in Gas-Mains, of which improvement the following is a specification.

In the accompanying drawing, which makes part of this specification, the figure is a transverse section through a roadway illustrating the application of my invention.

The object of my invention is to enable the existence and comparative extent of leaks in a line of pipe forming a gas-conducting main to be readily detected, to the end of preventing accident from the escape in quantity of inflammable or explosive gas; and my improvement consists in the combination, with an underground gas-main, of a detector-pipe leading from a point adjacent to the gas-main to a point above the surface of the ground; also, in the combination, with an underground gas-main, of bodies of packing composed of loose fragments of solid material surrounding the joints of the main, and a series of detector-pipes each leading from one of said bodies of packing to a point above the surface of the ground, as hereinafter more fully set forth.

In the practice of my invention I surround the gas-main 1 at and adjacent to the joints between its several members, the connections with branch lines, or other points at which leakage may be apprehended, with a body of packing, 2, composed of fragments of solid material—as broken stone, coarse gravel, small scrap metal, or the like—loosely arranged around the joint, so as to present a series of intercommunicating interstices or spaces throughout the packing 2, which is covered and inclosed on all sides by the ground 3, in which the main is laid. A detector-pipe, 4, opens at one end into each of the packing bodies 2, and leads therefrom to a point above the level of the ground, at which point its outer end is open, and may, if desired, be provided with a hood, 5, to prevent access of water to its interior. In the event of leakage at a joint of the main, the gas escaping therefrom will permeate the interstices of the loose packing 2, and pass therefrom through the detector-pipe 4 to the atmosphere, and an inspector, by testing the several detector-pipes by the application of a light to their ends, can ascertain the existence and location of leaks in the line, as well as judge of their extent by the nature of the combustion of the escaping gas.

In order to prevent liability to accident by the ignition of the gas within the packing, screens or diaphragms of fine wire-gauze or perforated sheet metal may be interposed at any convenient points in the detector-pipes. The packing 2 is readily located and removed as required in laying and repairing the line, and no openings in or connections with the main 1 are necessary.

I claim herein as my invention—

1. The combination of an underground gas-main and a detector-pipe leading from a point adjacent to said main to a point above the surface of the ground, substantially as set forth.

2. The combination of a gas-main, a packing of solid material having intercommunicating interstices and surrounding a joint of said main, said packing being inclosed by the ground in which the main is laid, and a detector-pipe leading from said packing to a point above the surface of the ground, substantially as set forth.

In testimony whereof I have hereunto set my hand.

GEO. WESTINGHOUSE, JR.

Witnesses:

J. SNOWDEN BELL,

R. H. WHITTLESEY.